(12) United States Patent
Oyama (10) Patent No.: US 10,122,047 B2
(45) Date of Patent: Nov. 6, 2018

(54) NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventor: Yutaka Oyama, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 193 days.

(21) Appl. No.: 14/661,249

(22) Filed: Mar. 18, 2015

(65) Prior Publication Data

US 2015/0280283 A1 Oct. 1, 2015

(30) Foreign Application Priority Data

Mar. 26, 2014 (JP) ................................ 2014-064350

(51) Int. Cl.

| H01M 4/13 | (2010.01) |
|---|---|
| H01M 4/60 | (2006.01) |
| H01M 6/04 | (2006.01) |
| H01M 6/16 | (2006.01) |
| H01M 10/0568 | (2010.01) |
| H01M 10/052 | (2010.01) |
| H01M 4/583 | (2010.01) |
| H01M 10/42 | (2006.01) |

(52) U.S. Cl.
CPC ....... *H01M 10/0568* (2013.01); *H01M 4/583* (2013.01); *H01M 10/052* (2013.01); *H01M 2010/4292* (2013.01); *H01M 2300/0025* (2013.01); *H01M 2300/0045* (2013.01); *Y02T 10/7011* (2013.01)

(58) Field of Classification Search
CPC .......... H01M 10/056; H01M 10/0561; H01M 10/0563; H01M 10/0567
See application file for complete search history.

(56) References Cited

U.S. PATENT DOCUMENTS

| 5,879,834 A * | 3/1999 | Mao ................. H01M 10/4235 429/332 |
|---|---|---|
| 2006/0088763 A1* | 4/2006 | Li ..................... H01M 10/0525 429/188 |
| 2013/0029232 A1 | 1/2013 | Zheng et al. |
| 2014/0242430 A1* | 8/2014 | Takahata .......... H01M 10/0567 429/61 |

FOREIGN PATENT DOCUMENTS

| CN | 102903954 A | 1/2013 | |
|---|---|---|---|
| JP | 2003-077478 | * 3/2003 | ............. H01M 4/62 |
| JP | 2005-135906 A | 5/2005 | |
| JP | 2013145737 A | 7/2013 | |
| JP | 2013-243020 A | 12/2013 | |

* cited by examiner

*Primary Examiner* — Olatunji A Godo
*Assistant Examiner* — Julian Anthony
(74) *Attorney, Agent, or Firm* — Sughrue Mion, PLLC

(57) ABSTRACT

A nonaqueous electrolyte secondary battery proposed herein is configured such that a positive-electrode active material layer includes graphite particles and a gas generant. Further, an electrolyte solution includes an $\alpha$ solute. Here, a relationship between an upper limit electric potential X of a positive electrode in a predetermined normal use area, an electric potential Y at which an amount of the $\alpha$ solute in the electrolyte solution begins to decrease due to the graphite particles, and an electric potential Z at which the gas generant begins to generate gas is X<Y<Z.

13 Claims, 5 Drawing Sheets

NONAQUEOUS ELECTROLYTE SECONDARY BATTERY

INCORPORATION BY REFERENCE

The disclosure of Japanese Patent Application No. 2014-064350 filed on Mar. 26, 2014 including the specification, drawings and abstract is incorporated herein by reference in its entirety.

BACKGROUND OF THE INVENTION

1. Field of the Invention

The present invention relates to a nonaqueous electrolyte secondary battery. Here, a "secondary battery" in the present specification indicates a general battery that is chargeable and dischargeable repeatedly. The "nonaqueous electrolyte secondary battery" indicates a secondary battery that uses a nonaqueous electrolyte made of a nonaqueous solvent in which an electrolyte salt is dissolved. A "lithium-ion secondary battery," which is one type of the "nonaqueous electrolyte secondary battery," indicates a secondary battery that uses lithium ion as electrolyte ion and performs charging and discharging by migration of electric charges between positive and negative electrodes along with lithium ions. Generally, a battery called a "lithium secondary battery" can be included in the lithium-ion secondary battery in the present specification.

2. Description of Related Art

As such a nonaqueous electrolyte secondary battery, Japanese Patent Application Publication No. 2013-243020 (JP 2013-243020 A), for example, describes a battery provided with a mechanism (a current interrupt device: CID) that interrupts current when an overcharge state is detected based on a battery temperature, a battery internal pressure, or the like. In the battery described herein, cyclohexylbenzene (hereinafter referred to "CHB" as appropriate in the present specification) is added, as a gas generation additive, to an electrolyte solution.

SUMMARY OF THE INVENTION

In the meantime, the battery provided with the CID has such a tendency that, as an additive amount of CHB used as the gas generation additive is larger, more gas is generated at the time of overcharge, so that the CID operates smoothly. However, if the additive amount of CHB used as the gas generation additive is too large, a battery resistance in a normal use area tends to increase. Further, even if the additive amount of CHB is increased, a gas amount to be generated at the time of overcharge may not be increased more than a given amount.

A nonaqueous electrolyte secondary battery proposed herein includes: a battery outer case; an electrode body accommodated in the battery outer case; and an electrolyte solution accommodated in the battery outer case. Here, the electrode body may include a positive current collector, and a positive-electrode active material layer held by the positive current collector. The positive-electrode active material layer may include graphite particles and a gas generant. The electrolyte solution may include an α solute. Here, a relationship between an upper limit electric potential X of a positive electrode in a predetermined normal use area, an electric potential Y at which an amount of the α solute in the electrolyte solution begins to decrease due to the graphite particles, and an electric potential Z at which the gas generant begins to generate gas is X<Y<Z. In this case, it is possible to restrain a battery resistance to be low, and to smoothly generate a large amount of gas at the time of overcharge. Accordingly, in a case where a CID is provided, for example, the CID can be operated smoothly. Here, the electric potential X, the electric potential Y, and the electric potential Z are electric potentials (vs. Li/Li+) with an equilibrium potential of a lithium metal electrode being taken as 0 V.

The electric potential Y may be any electric potential within a range from an electric potential lower than the electric potential Z by 0.05 V to an electric potential lower than the electric potential Z by 0.35 V.

The battery outer case may include the gas generant. An amount of the gas generant may be equal to or larger than 3.0 wt % and less than 7.0 wt % relative to the electrolyte solution. The positive-electrode active material layer may include at least one third of the gas generant included in the battery outer case.

The gas generant may be cyclohexylbenzene and/or biphenyl, for example. A mass ratio of the graphite particles included in the positive-electrode active material layer may be larger than a mass ratio of the gas generant included in the positive-electrode active material layer. The graphite particles may be flake graphite. The α solute may be, for example, an ionic liquid including a cation having a planar structure insertable, between layers of the graphite particles. The α solute may be imidazolium salt, pyridinium salt, or pyrrolidinium salt, for example. An additive amount of the α solute in the electrolyte solution may be less than 5 mol/L.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment on a nonaqueous electrolyte secondary battery proposed herein is described below. Naturally, the embodiment described herein is not intended to limit the present invention in particular. Further, each drawing is illustrated schematically, and a dimensional relationship (length, width, thickness, and the like) in each drawing does not show an actual dimensional relationship, for example. Further, the same reference sign is assigned to members/ portions that yield the same effect, and a redundant description is omitted or simplified appropriately.

First, a lithium-ion secondary battery 10 is described as an example of the nonaqueous electrolyte secondary battery, and an applicable exemplary structure of the lithium-ion secondary battery 10 is described. Then, a proposal structure of the lithium-ion secondary battery 10 is described.

Figure 1:
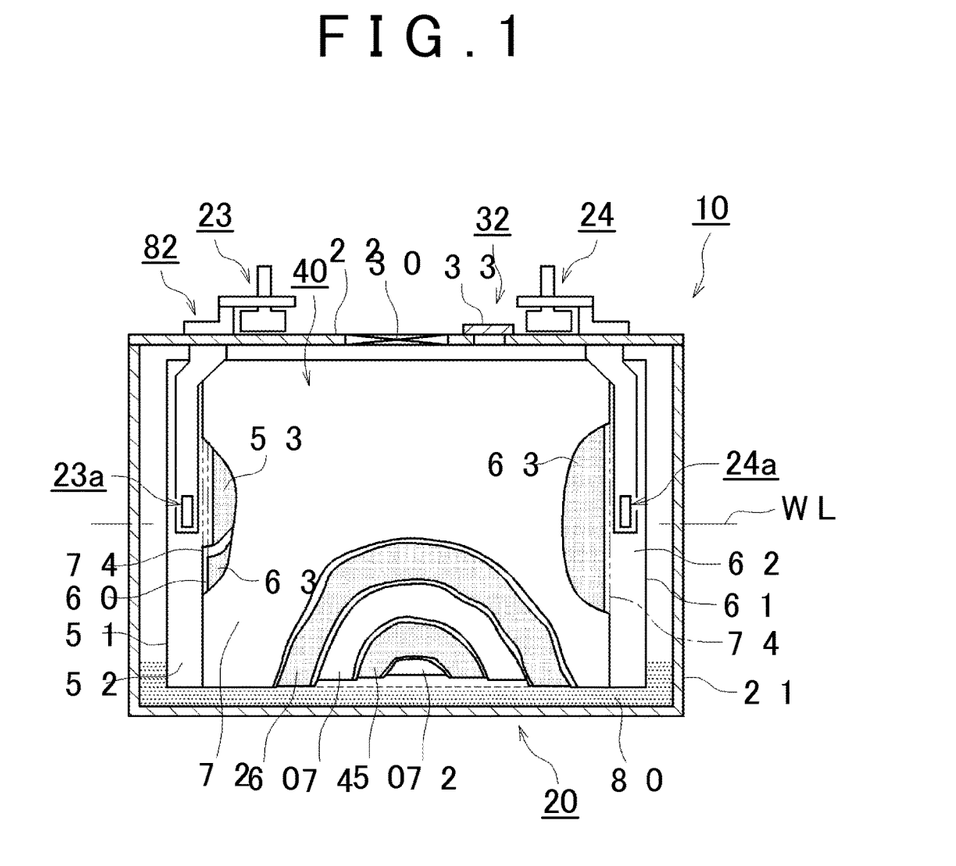
FIG. 1 is a sectional view illustrating a lithium-ion secondary battery.
Figure 2:
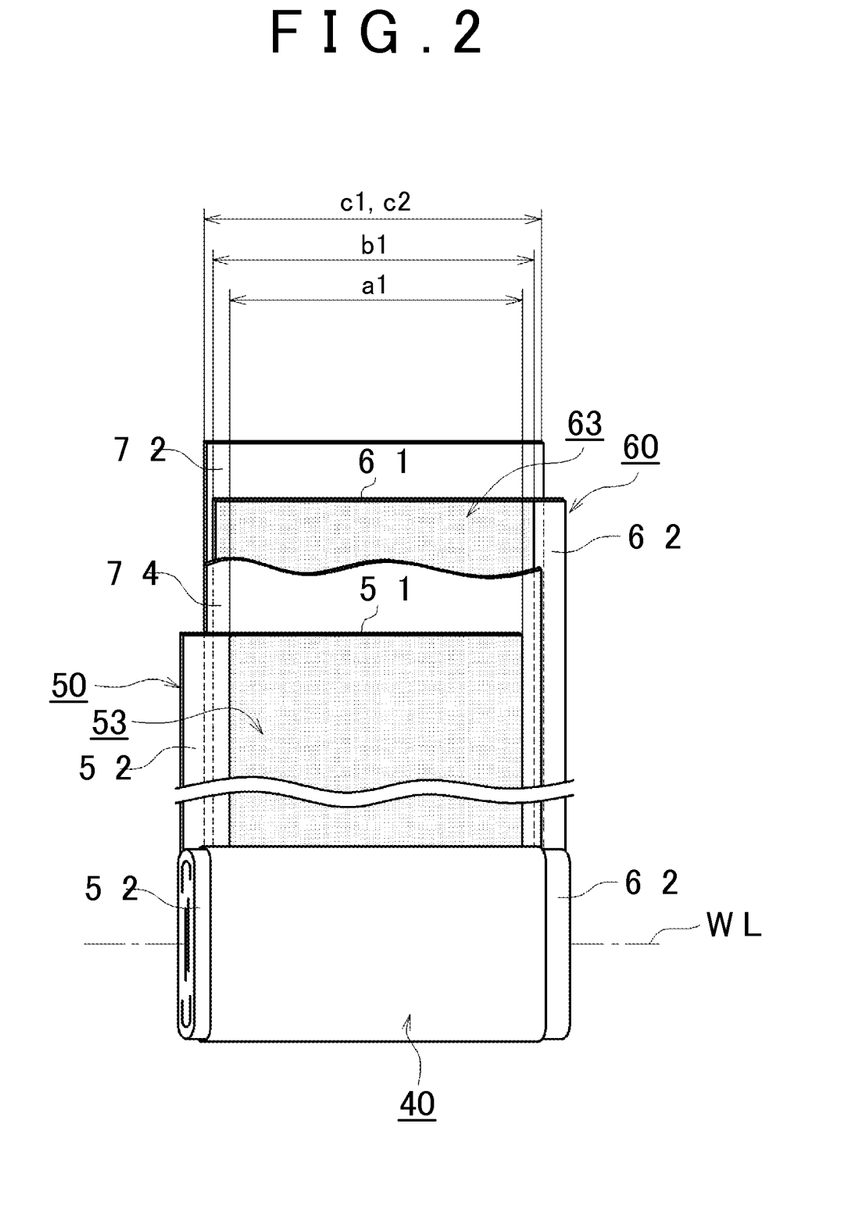
FIG. 2 is a view illustrating an electrode body provided in the lithium-ion secondary battery.

<<Lithium-ion Secondary Battery 10>> FIG. 1 is a sectional view illustrating the lithium-ion secondary battery 10. FIG. 2 is a view illustrating an electrode body 40 provided in the lithium-ion secondary battery 10. Note that the lithium-ion secondary battery 10 illustrated in FIGS. 1 and 2 is merely one example of a lithium-ion secondary battery to which the present invention is applicable, and does not limit a shape and a structure of the lithium-ion secondary battery to which the present invention is applicable.

As illustrated in FIG. 1, the lithium-ion secondary battery 10 includes a battery outer case 20 and an electrode body 40 (a wound electrode body in FIG. 1).

<<Battery Outer Case 20>> The battery outer case 20 includes a case main body 21 and a sealing plate 22. The case main body 21 has a box shape having an opening in one end. Here, the case main body 21 has a bottomed rectangular solid shape of which one side corresponding to a top face of the lithium-ion secondary battery 10 in a normal use state is opened. In the present embodiment, a rectangular opening is formed in the case main body 21. The sealing plate 22 is a member that closes the opening of the case main body 21. The sealing plate 22 is made of a generally rectangular plate. The sealing plate 22 is welded to a peripheral edge of the opening of the case main body 21, so that the battery outer case 20 is formed to have a generally hexahedral shape.

In terms of a material of the battery outer case 20, the battery outer case 20 mainly made of a metal material that is lightweight and has an excellent thermal conductivity can be preferably used. Examples of such a metal material include aluminum, stainless steel, nickel plating steel, and the like, for example. The battery outer case 20 (the case main body 21 and the sealing plate 22) according to the present embodiment is made of aluminum or alloy mainly including aluminum.

In an example illustrated in FIG. 1, a positive electrode terminal 23 (an external terminal) and a negative electrode terminal 24 (an external terminal) for external connections are attached to the sealing plate 22. A relief valve 30 and an injection opening 32 are formed in the sealing plate 22. The relief valve 30 is configured to relieve an internal pressure of the battery outer case 20 when the internal pressure increases to a predetermined level (e.g., a setting valve opening pressure of about 0.3 MPa to 1.0 MPa) or more. Further, FIG. 1 illustrates a state where the injection opening 32 is sealed by a sealing material 33 after an electrolyte solution 80 is injected. The electrode body 40 is accommodated in the battery outer case 20.

<<Electrode Body 40 (Wound Electrode Body)>> As illustrated in FIG. 2, the electrode body 40 includes a belt-shaped positive electrode (a positive electrode sheet 50), a belt-shaped negative electrode (a negative electrode sheet 60), and belt-shaped separators (separators 72, 74).

<<Positive Electrode Sheet 50>> The positive electrode sheet 50 includes a belt-shaped positive current collector foil 51 and a positive-electrode active material layer 53. A metal foil suitable for a positive electrode can be preferably used as the positive current collector foil 51. A belt-shaped aluminum foil having a predetermined width and a thickness of about 15 μm can be used as the positive current collector foil 51, for example. An exposed part 52 is set along an edge of the positive current collector foil 51 on one side in a width direction. In an example illustrated herein, the positive-electrode active material layer 53 is formed on either side of the positive current collector foil 51 except for the exposed part 52 set in the positive current collector foil 51. Here, the positive-electrode active material layer 53 is held by the positive current collector foil 51, and includes at least a positive-electrode active material.

As the positive-electrode active material, it is possible to use one or more substances conventionally used for a lithium-ion secondary battery without any particular limit. Preferable examples thereof include: oxides (lithium transition metal oxides) including lithium and a transition metal element as constituent metal elements, such as a lithium nickel oxide (e.g., $LiNiO_2$), a lithium cobalt oxide (e.g., $LiCoO_2$), and a lithium manganese oxide (e.g., $LiMn_2O_4$); and phosphate including lithium and a transition metal element as constituent metal elements, such as manganese phosphate lithium ($LiMnPO_4$), and lithium iron phosphate ($LiFePO_4$). The positive-electrode active material is used in a particulate shape, and can be referred to as positive-electrode active material particles appropriately.

<Conductive Material> The positive-electrode active material layer 53 includes a conductive material appropriately. Examples of the conductive material are carbon materials such as carbon powder or carbon fiber. One selected from such conductive materials may be used solely, or two or more materials may be used in combination. Examples of the carbon powder usable herein include carbon powders such as various carbon black (e.g., acetylene black, oil furnace black, carbon black, Ketjen black), and graphite powder.

<Binder> Further, a binder causes particles of the positive-electrode active material and the conductive material included in the positive-electrode active material layer 53 to be bound to each other, or causes these particles to be bound to the positive current collector foil 51. Such a binder used herein can be a polymer dissolvable or dispersible in a solvent to be used. For example, in a case of a positive electrode mixture composition using an aqueous solvent, water-soluble or water-dispersible polymers can be preferably employed. Examples of the water-soluble or water-dispersible polymers include: cellulose polymers (carboxymethyl cellulose (CMC), hydroxypropyl methylcellulose (HPMC), and the like); fluorinated resins (e.g., polyvinyl alcohol (PVA), polytetrafluoroethylene (PTFE), tetrafluoroethylene-hexafluoropropylene copolymer (FEP), and the like); and rubbers (acetic acid vinyl copolymer, styrene-butadiene copolymer (SBR), acrylic acid modified SBR resin (SBR latex), and the like). Further, in a case of a positive electrode mixture composition using a nonaqueous solvent, polymers (polyvinylidene fluoride (PVDF), polyvinylidene chloride (PVDC, polyacrylonitrile (PAN), and the like) can be preferably employed.

<<Negative Electrode Sheet 60>> As illustrated in FIG. 2, the negative electrode sheet 60 includes a belt-shaped negative current collector foil 61 and a negative-electrode active material layer 63. A metal foil suitable for a negative electrode can be preferably used as the negative current collector foil 61. A belt-shaped copper foil having a predetermined width and a thickness of about 10 μm is used as the negative current collector foil 61. An exposed part 62 is set along an edge of the negative current collector foil 61 on one side in a width direction. The negative-electrode active material layer 63 is formed on either side of the negative current collector foil 61 except for the exposed part 62 set in the negative current collector foil 61. The negative-electrode active material layer 63 is held by the negative current collector foil 61, and includes at least a negative-electrode active material.

As the negative-electrode active material, it is possible to use one or more substances conventionally used for a lithium-ion secondary battery without any particular limit. Preferable examples thereof include carbon materials such as graphite carbon and amorphous carbon, lithium transition metal oxides, and lithium transition metal nitrides. The negative-electrode active material is used in a particulate shape, and can be referred to as negative-electrode active material particles, appropriately. The positive-electrode active material particles and the negative-electrode active material particles can be referred to as active material particulates, appropriately. Further, the positive-electrode active material particles and the negative-electrode active material particles each can be used in a powder shape, appropriately.

<<Separators 72, 74>> As illustrated in FIG. 2, the separators 72, 74 are members that separate the positive electrode sheet 50 from the negative electrode sheet 60. In this example, the separators 72, 74 are each constituted by a sheet material having a plurality of minute pores and having a belt shape with a predetermined width. Examples of the separators 72, 74 include a monolayer-structure separator and a laminated-structure separator each made of a porous resin film, e.g., porous polyolefin resin. In this example, as illustrated in FIG. 2, a width b1 of the negative-electrode active material layer 63 is slightly wider than a width a1 of the positive-electrode active material layer 53. Further, widths c1, c2 of the separators 72, 74 are slightly wider than the width b1 of the negative-electrode active material layer 63 (c1, c2>b1>a1).

Further, the separators 72, 74 insulate the positive-electrode active material layer 53 from the negative-electrode active material layer 63, and allow movement of an electrolyte. Although not illustrated herein, the separators 72, 74 may be configured such that a heat resistance layer is formed on a surface of a base material made of a plastic porous film. The heat resistance layer is constituted by a filler and a binder. The heat resistance layer is also referred to as HRL (Heat Resistance Layer).

<<Attachment of Electrode Body 40>> In the present embodiment, the electrode body 40 is bent flatly by pushing along one plane surface including a winding shaft WL, as illustrated in FIG. 2. As illustrated in FIG. 2, the exposed part 52 of the positive current collector foil 51 and the exposed part 62 of the negative current collector foil 61 are exposed in a spiral manner on opposite sides of the separators 72, 74. As illustrated in FIG. 1, the negative and positive exposed parts 52, 62 protruding from the separators 72, 74 are welded to tip ends 23a, 24a of the positive and negative electrode terminals 23, 24. In the configuration illustrated in FIG. 1, the flat wound electrode body 40 is accommodated in the battery outer case 20 along one plane surface including the winding shaft WL. Further, the electrolyte solution 80 is injected into the battery outer case 20. The electrolyte solution 80 comes inside the electrode body 40 from axial opposite sides of the winding shaft WL (see FIG. 2).

<<Electrolyte Solution (Liquid Electrolyte)>> As the electrolyte solution 80, it is possible to use a nonaqueous electrolyte solution conventionally used for a lithium-ion secondary battery without any particular limit. The nonaqueous electrolyte solution typically has a composition in which a supporting salt is contained in an appropriate nonaqueous solvent. As the nonaqueous solvent, it is possible to use one or more solvents selected from ethylene carbonate (hereinafter referred to as "EC" appropriately), propylene carbonate, dimethyl carbonate (hereinafter referred to as "DMC" appropriately), diethyl carbonate, ethylmethyl carbonate (hereinafter referred to as "EMC" appropriately), 1,2-dimethoxyethane, 1,2-diethoxyethane, tetrahydrofuran, 1,3-dioxolane, and the like. Further, as the supporting salt, lithium salts such as $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$ can be used, for example. One example thereof is a nonaqueous electrolyte solution obtained by adding $LiPF_6$ to a mixed solvent of ethylene carbonate with diethyl carbonate (at a composition ratio of 1:1, for example) so that a concentration of $LiPF_6$ is approximately 1 mol/L.

Note that FIG. 1 schematically illustrates the electrolyte solution 80 to be injected into the battery outer case 20, and does not strictly illustrate an amount of the electrolyte solution 80 to be injected into the battery outer case 20. Further, the electrolyte solution 80 injected into the battery outer case 20 sufficiently sinks into gaps or the like in the positive-electrode active material layer 53 and in the negative-electrode active material layer 63 inside the wound electrode body 40. The positive current collector foil 51 and the negative current collector foil 61 of such a lithium-ion secondary battery 10 are electrically connected to an external device via the electrode terminals 23, 24 that penetrate through the battery outer case 20. The following describes operations of the lithium-ion secondary battery 10 at the time of charging and at the time of discharging.

<<Operation in Charging>> At the time of charging, a voltage is applied to between the positive electrode sheet 50 and the negative electrode sheet 60 in the lithium-ion secondary battery 10, so that lithium ions (Li) are released into the electrolyte solution from the positive-electrode active material in the positive-electrode active material layer 53, and electric charges are released from the positive-electrode active material layer 53. The negative electrode sheet 60 stores the electric charges therein, while the lithium ions (Li) in the electrolyte solution are absorbed and stored in the negative-electrode active material in the negative-electrode active material layer 63. Hereby, an electric potential difference occurs between the negative electrode sheet 60 and the positive electrode sheet 50.

<<Operation in Discharging>> At the time of discharging, in the lithium-ion secondary battery 10, due to the electric potential difference between the negative electrode sheet 60 and the positive electrode sheet 50, the electric charges are sent to the positive electrode sheet 50 from the negative electrode sheet 60, and the lithium ions stored in the negative-electrode active material layer 63 are released to the electrolyte solution. Further, in the positive electrode, the lithium ions in the electrolyte solution are taken into the positive-electrode active material in the positive-electrode active material layer 53.

As such, at the time of charging and discharging of the lithium-ion secondary battery 10, the lithium ions are stored or released in the positive-electrode active material of the positive-electrode active material layer 53 or in the negative-electrode active material of the negative-electrode active material layer 63. The lithium ions come and go between the positive-electrode active material layer 53 and the negative-electrode active material layer 63 via the electrolyte solution.

Such a nonaqueous electrolyte secondary battery (e.g., the lithium-ion secondary battery 10) may be provided with a current interrupt device 82 to interrupt current when an overcharge state is detected based on a battery temperature, a battery internal pressure, or the like. Hereinafter, the current interrupt device 82 is referred to as "CID" appropriately. The nonaqueous electrolyte secondary battery provided with the CID 82 includes a gas generant such as cyclohexylbenzene (CHB). Here, cyclohexylbenzene reacts at an electric potential of about 4.6 V, for example, so as to generate gas. Accordingly, with respect to a lithium-ion secondary battery of which an upper limit of an electric potential in a normal use area is around 4.1 V, for example, cyclohexylbenzene can generate gas at an electric potential (an electric potential of about 4.5 V) in an overcharge state beyond the upper limit in the use area, thereby allowing the CID 82 to operate. As illustrated in FIG. 1, the CID 82 can be provided in the positive electrode terminal 23, for example. Note that a structure of the CID 82 is described, for example, in JP 2013-243020, and the structure thereof can be used. Further, the structure of the CID 82 is not limited in particular, and various mechanisms can be employed.

Here, at the time of overcharge, an electric potential of the positive electrode increases. Cyclohexylbenzene is decomposed in the positive electrode at the time of overcharge (it begins to be decomposed at an electric potential (vs. Li/Li+) of around 4.6 V) so as to generate a proton ($H^+$). The proton ($H^+$) generated in the positive electrode moves to the negative electrode and is reduced to generate hydrogen gas ($H_2$). In the meantime, the battery provided with the CID 82 has such a tendency that, as an additive amount of CHB used as a gas generation additive is larger, more gas is generated at the time of overcharge, so that the CID 82 operates smoothly. However, a battery resistance in the normal use area tends to increase. Further, cyclohexylbenzene may be included the positive-electrode active material layer 53, as well as cyclohexylbenzene being added to the electrolyte solution 80. However, based on the knowledge of the inventor(s), as the amount of CHB included in the positive-electrode active material layer 53 is increased, the battery resistance tends to increase accordingly.

Figure 3:
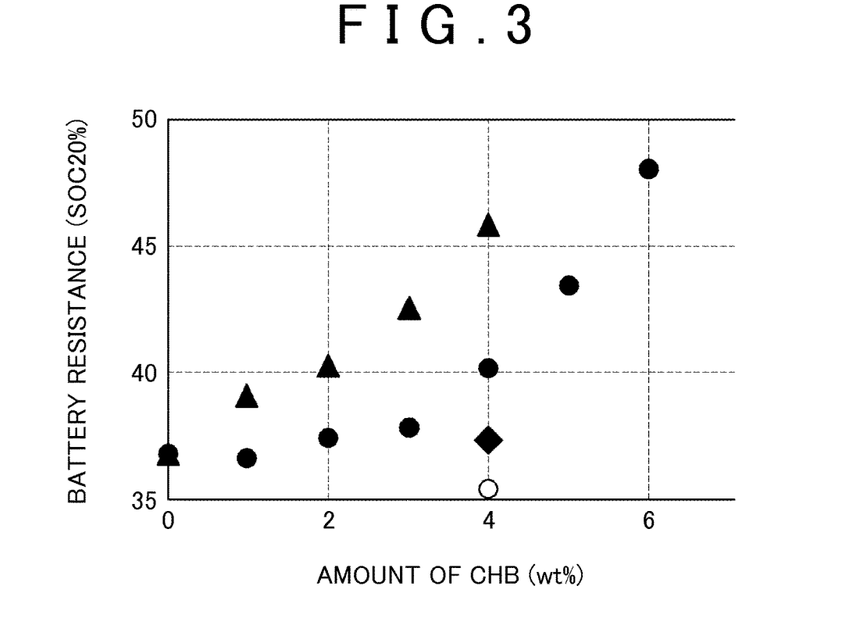
FIG. 3 is a graph showing a relationship between an amount of CHB included in the battery and a battery resistance.

Here, FIG. 3 is a graph showing a relationship between the amount of cyclohexylbenzene included in the battery and the battery resistance. A horizontal axis in FIG. 3 indicates the amount of cyclohexylbenzene included in the battery, and a vertical axis indicates the battery resistance. Further, FIG. 4 shows a relationship between the amount of cyclohexylbenzene included in the battery and the gas generation amount.

<<Amount of CHB included in Battery>> Here, the amount of cyclohexylbenzene (CHB) included in the battery is evaluated in terms of an amount corresponding to a mass ratio (wt %) in the electrolyte solution 80 in a case where cyclohexylbenzene is added to the electrolyte solution 80. For example, in a case where cyclohexylbenzene is added to the electrolyte solution 80, its amount is evaluated in terms of a mass ratio (wt %) in the electrolyte solution 80. In a case where cyclohexylbenzene is included in the positive-electrode active material layer 53, it is assumed that cyclohexylbenzene included in the positive-electrode active material layer 53 is all added to the electrolyte solution 80. Then, a mass ratio (wt %) of cyclohexylbenzene in the electrolyte solution is obtained, and the amount of cyclohexylbenzene is evaluated based on the mass ratio thus obtained. Further, in a case where cyclohexylbenzene is partially added to the electrolyte solution 80 and further partially included in the positive-electrode active material layer 53, it is assumed that cyclohexylbenzene included in the battery, including the cyclohexylbenzene included in the positive-electrode active material layer 53, is all added to the electrolyte solution 80. Then, a mass ratio (wt %) of cyclohexylbenzene in the electrolyte solution 80 is obtained, and the amount of cyclohexylbenzene is evaluated based on the mass ratio thus obtained. Note that the amount of cyclohexylbenzene included in the battery is referred to as the "amount of CHB," appropriately.

Figure 4:
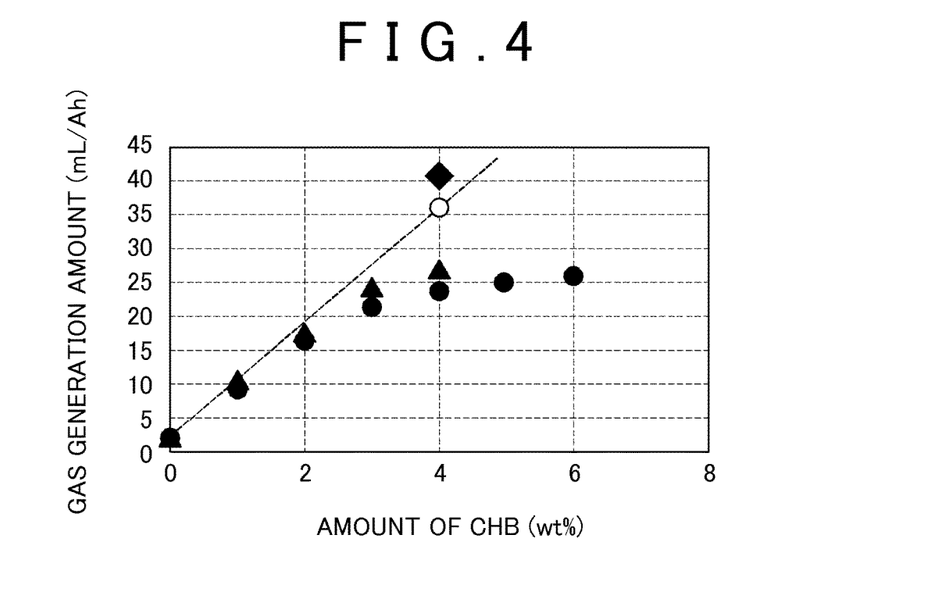
FIG. 4 is a graph showing a relationship between the amount of CHB included in the battery and a gas generation amount.

Here, in FIGS. 3 and 4, a black circular plot indicates a case where all cyclohexylbenzene is added to the electrolyte solution 80. A black triangular plot indicates a case where all cyclohexylbenzene is included in the positive-electrode active material layer 53. Note that FIGS. 3 and 4 indicate the battery resistance and the gas generation amount, respectively, which were measured in such a manner that batteries (batteries for test) were manufactured under respective predetermined conditions with different additive amounts of cyclohexylbenzene in different addition manners. Here, a manufacturing method of the battery manufactured herein and measuring methods of the battery resistance and the gas generation amount will be described later.

Here, the inventor(s) found that, as illustrated in FIG. 3, in a case where all cyclohexylbenzene is added to the electrolyte solution 80, the battery resistance is generally restrained to be low until the amount of cyclohexylbenzene is around 3.5 wt %, as indicated by the black circular plots. However, when the amount of cyclohexylbenzene added to the electrolyte solution 80 is larger than 4.0 wt %, it is markedly shown that the battery resistance tends to increase gradually. The inventor(s) considers that such a tendency is caused for the following reason. That is, if the additive amount of cyclohexylbenzene used as the gas generation additive is too large, a viscosity of the electrolyte solution 80 increases, so that a diffusive resistance of lithium ions in the electrolyte solution 80 increases. It is considered that the tendency becomes remarkable when the amount reaches about 4.0 wt %.

Further, in a case where all cyclohexylbenzene is added to the positive-electrode active material layer 53, as the additive amount of cyclohexylbenzene is larger, the battery resistance tends to increase gradually, as indicated by the black triangular plots. The inventor(s) considers that such a tendency is caused for the following reason. That is, when the amount of cyclohexylbenzene is increased in the positive-electrode active material, the diffusion of lithium ions in the positive-electrode active material layer 53 is obstructed, so that a direct-current resistance in the positive-electrode active material layer 53 is increased.

In a case where the additive amount of cyclohexylbenzene is increased, the gas amount to be generated, at the time of overcharge may not increase more than a given amount. The inventor(s) found that, as indicated by the black circular plots in FIG. 4, for example, in a case where all cyclohexylbenzene is added to the electrolyte solution, as the amount of cyclohexylbenzene is increased, the gas generation amount at the time of overcharge tends to increase until the amount of CHB added to the electrolyte solution reaches about 4.0 wt %. However, even if the amount of cyclohexylbenzene added to the electrolyte solution is more than 4.0 wt %, the gas generation amount at the time of overcharge tends to not increase.

The inventor(s) assumes the reason why the gas generation amount at the time of overcharge is not increased even if the amount of cyclohexylbenzene added to the electrolyte solution is more than 4.0 wt %, as follows. At the time of overcharge, an electric potential of the positive electrode increases. Because of this, cyclohexylbenzene in the electrolyte solution reacts mainly on the surface of the positive-electrode active material layer 53 so as to generate gas. In the reaction that cyclohexylbenzene generates gas, a polymerization reaction occurs at the same time, so that a film is formed on the surface of the positive-electrode active material layer 53. At this time, when the film is formed at a given level or more, the surface of the positive-electrode active material layer 53 is covered with the film, so that the reaction of cyclohexylbenzene is restrained. Because of this, the gas generation amount is not increased to more than a given amount. That is, even if cyclohexylbenzene added to the electrolyte solution is increased, there is such a tendency that gas is not generated at more than a given amount.

In the meantime, as indicated by the black triangular plots in FIG. 4, in a case where cyclohexylbenzene is included in the positive-electrode active material layer 53, the gas generation amount at the time of overcharge tends to increase as more cyclohexylbenzene is included in the positive-electrode active material layer 53. This is because cyclohexylbenzene included in the positive-electrode active material layer 53 causes a reaction. That is, even in a case where the film is formed on the surface of the positive-electrode active material layer 53 as described above, cyclohexylbenzene included in the positive-electrode active material layer 53 causes a reaction. As a result, as the amount of cyclohexylbenzene included in the positive-electrode active material layer 53 is larger, the gas generation amount tends to increase. However, as indicated by the black triangular plots in FIG. 3, as the amount of cyclohexylbenzene included in the positive-electrode active material layer 53 is larger, the battery resistance is higher. In view of this, there is also a disadvantage in increasing the amount of cyclohexylbenzene included in the positive-electrode active material layer 53 too much.

Figure 5:
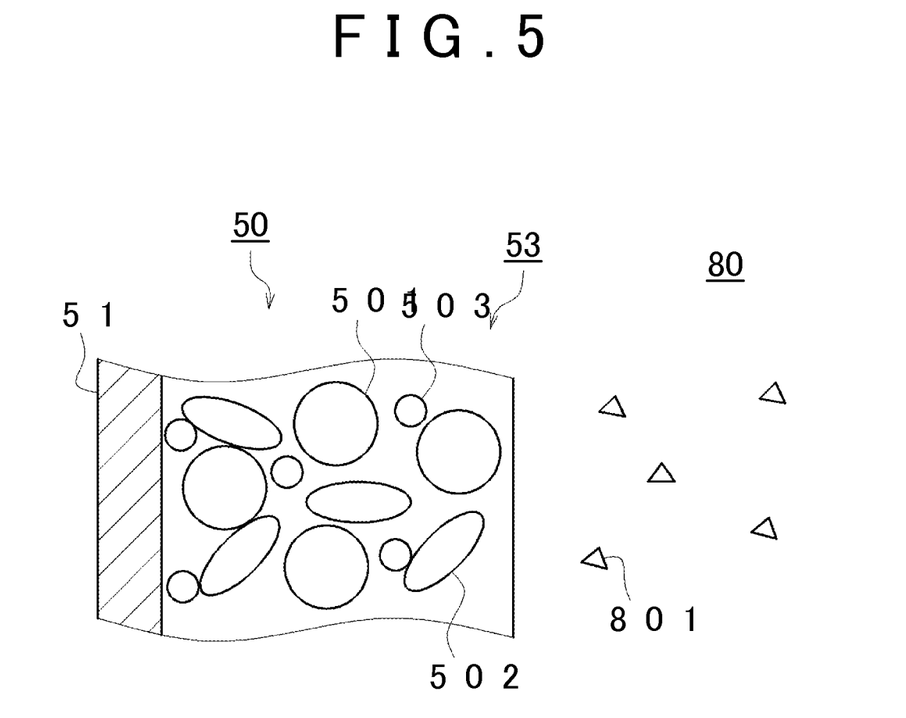
FIG. 5 is a schematic view illustrating a positive electrode sheet and an electrolyte solution of a nonaqueous electrolyte secondary battery proposed herein.

<<Proposed Structure of Nonaqueous Electrolyte Secondary Battery>> Under such findings, the inventor(s) proposes the following structure. FIG. 5 schematically illustrates the positive electrode sheet 50 and the electrolyte solution 80 of the nonaqueous electrolyte secondary battery proposed herein.

The nonaqueous electrolyte secondary battery 10 proposed herein is configured such that the positive-electrode active material layer 53 includes graphite particles 502, and a gas generant 503. Further, the electrolyte solution 80 includes an α solute 801. Here, the α solute 801 is a material configured such that an amount thereof in the electrolyte solution 80 begins to decrease due to the graphite particles 502 at an electric potential higher than an upper limit potential of the positive electrode in a predetermined normal use area. The gas generant 503 is a material that is decomposed to generate gas at an electric potential higher than the electric potential at which the amount of the α solute 801 begins to decrease. In other words, a relationship between an upper limit electric potential X of the positive electrode in the predetermined normal use area, an electric potential Y at which the amount of the α solute 801 in the electrolyte solution 80 begins to decrease due to the graphite particles 502, and an electric potential Z at which the gas generant 503 begins to generate gas may be X<Y<Z. Here, the electric potentials can be determined based on an equilibrium potential (vs. Li/Li+) of metallic lithium.

<<Overcharge State>> Here, a normal use area is set to a cell voltage in the nonaqueous electrolyte secondary battery. Further, when the normal use area is determined, the upper limit electric potential of the positive electrode of the nonaqueous electrolyte secondary battery in the normal use area is determined. The overcharge state is a state in which charging is performed until a cell voltage reaches a voltage that is higher than the normal use area. Further, in the overcharge state, the electric potential of the positive electrode of the nonaqueous electrolyte secondary battery is higher than the upper limit electric potential in the normal use area. In the lithium-ion secondary battery, an upper limit voltage (a cell voltage) of the normal use area is set to 3.8 V to 4.2 V. An electric potential of the negative electrode at the upper limit voltage of the normal use area is about 0.1 V (vs. Li/Li+). The upper limit electric potential of the positive electrode of the nonaqueous electrolyte secondary battery in the normal use area is about 3.9 V to 4.3 V (vs. Li/Li+). Thus, the upper limit voltage of charging is set in the nonaqueous electrolyte secondary battery. The upper limit electric potential of the positive electrode of the nonaqueous electrolyte secondary battery in the normal use area is determined according to the upper limit voltage. A state where the nonaqueous electrolyte secondary battery is charge at a voltage higher than the upper limit voltage is the overcharge state.

<<Gas Generant 503>> Here, the gas generant 503 is a material that is decomposed to generate gas in the overcharge state. Specific examples of the gas generant 503 include aromatic compounds such as a biphenyl compound, an alkyl biphenyl compound, a cycloalkyl benzene compound, an alkyl benzene compound, an organophosphorus compound, fluorine atom substitutional aromatic compound, a carbonate compound, a cyclic carbamate compound, and an alicyclic hydrocarbon.

More specific compounds are as follows: biphenyl (4.5 V), cyclohexylbenzene (4.6 V), 1-fluoro-2-cyclohexylbenzene (4.8 V), 1-fluoro-3-cyclohexylbenzene (4.8 V), 1-fluoro-4-cyclohexylbenzene (4.8 V), 1-bromo-4-cyclohexylbenzene (4.8 V), trans-butylcyclohexyl benzene (4.6 V), cyclopentyl benzene, tert-butyl benzene (4.9 V), tert-pentyl benzene (4.8 V), 1-fluoro-4-tert-butyl benzene (4.9 V), 1-chloro-4-tert-butyl benzene (4.9 V), 1-bromo-4-tert-butyl benzene (4.9 V), tert-pentyl benzene (4.8 V), 1-fluoro-4-tert-pentyl benzene (4.8 V), 1-chloro-4-tert-pentyl benzene (4.8 V), 1-bromo-4-tert-pentyl benzene (4.8 V), tert-aminobenzene, terphenyl, 2-fluorinated biphenyl, 3-fluorinated biphenyl, 4-fluorinated biphenyl, 4,4'-difluorobiphenyl, o-cyclohexyl fluorobenzene, p-cyclohexyl fluorobenzene, tris-(t-butyl phenyl) phosphate (4.8 V), phenyl fluoride (4.9 V), 4-fluorophenyl acetate (4.7 V), a diphenyl carbonate (4.9 V), methylphenyl carbonate (4.8 V), bis tertiary butylphenyl carbonate (4.7 V), diphenyl ether, dibenzofuran, and the like. Here, an electric potential in each parenthesis indicates an oxidation potential (vs. Li/Li+) of each compound. As the gas generant 503, one or more compounds can be used without any limitation.

In a general lithium-ion secondary battery in which the upper limit electric potential (vs. Li/Li+) of the positive electrode in the normal use area is set to around 3.9 to 4.3 V, biphenyl or cyclohexylbenzene can be preferably employed, for example. The oxidation potentials (vs. Li/Li+) of biphenyl and cyclohexylbenzene are approximately 4.5 to 4.6 V, which are relatively close to the upper limit electric potential (3.9 V to 4.3 V (vs. Li/Li+)) of the positive electrode of the general lithium-ion secondary battery. Accordingly, at a relatively early stage after the battery exceeds the upper limit electric potential (vs. Li/Li+) of the positive electrode in the normal use area to enter an overcharge state, the gas generant 503 can be decomposed by oxidation to generate gas immediately. Here, the following description deals with a case where cyclohexylbenzene is used as the gas generant 503, appropriately.

In this case, the gas generant 503 necessary for the operation of the CID 82 (see FIG. 1) may be included in the battery outer case 20. At this time, the gas generant 503 may be included in the positive-electrode active material layer 53. When the gas generant 503 is included in the positive-electrode active material layer 53, the gas generant 503 included in the electrolyte solution 80 can be reduced. When the gas generant 503 included in the electrolyte solution 80 is decomposed, the gas generant 503 is polymerized on the surface of the positive-electrode active material layer 53 so as to form a film. Due to the film, such a phenomenon occurs that the gas generant 503 supplied from the electrolyte solution 80 to the surface of the positive-electrode active material layer 53 is reduced and gas to be generated is not increased. In contrast, the nonaqueous electrolyte secondary battery proposed herein is configured such that the gas generant 503 is included in the positive-electrode active material layer 53. Accordingly, even if the film is formed on the surface of the positive-electrode active material layer 53, gas is generated.

In the nonaqueous electrolyte secondary battery proposed herein, the battery outer case 20 may include the gas generant 503 with an amount of not less than 3.0 wt % but less than 7.0 wt % relative to the electrolyte solution 80. This makes it possible to secure a gas amount necessary for the CID 82 to operate smoothly. In this case, at least one third of the gas generant 503 included in the battery outer case 20 may be included in the positive-electrode active material layer 53. In this case, all the gas generant 503 included in the battery outer case 20 may be included in the positive-electrode active material layer 53.

Further, in a case where not all the gas generant 503 is included in the positive-electrode active material layer 53, the gas generant 503 that is not included in the positive-electrode active material layer 53 may be added to the electrolyte solution 80. In this case, since the gas generant 503 is included in the positive-electrode active material layer 53, even if the amount of the gas generant 503 to be added to the electrolyte solution 80 is reduced, a given gas generation amount can be secured at the time of overcharge by just that much. Further, since the gas generant 503 is included in the positive-electrode active material layer 53, the amount of the gas generant 503 to be included in the electrolyte solution 80 can be reduced by just that much. By reducing the gas generant 503 to be included in the electrolyte solution 80, it is possible to prevent a decrease in a diffusion speed of lithium ions in the electrolyte solution 80 in the lithium-ion secondary battery, thereby making it possible to restrain an increase in the battery resistance to be low. Note that the amount of the gas generant 503 included in the electrolyte solution 80 may be less than 3.5 wt % relative to the electrolyte solution 80. When the amount of the gas generant 503 included in the electrolyte solution 80 is less than 3.5 wt % relative to the electrolyte solution 80, it is possible to prevent a remarkable decrease in the diffusion speed of lithium ions in the electrolyte solution 80. In view of this, the amount of the gas generant 503 included in the electrolyte solution 80 may be less than 3.0 wt % relative to the electrolyte solution 80.

As the amount of the gas generant 503 included in the battery outer case 20 is larger, more gas is generated, thereby making it possible to operate the CID 82 smoothly. In view of this, when it is assumed that an entire amount of the gas generant 503 is added to the electrolyte solution 80, the gas generant 503 is included in the battery outer case 20 with an amount corresponding to not less than 3.5 wt %, more preferably, an amount corresponding to not less than 4 wt % relative to the electrolyte solution 80. Further, as the amount of the gas generant 503 included in the battery outer case 20 is larger, a diffusive resistance of ions in the electrolyte solution 80 and a direct-current resistance of the positive-electrode active material layer 53 tends to increase. In view of this, in a case where the gas generation amount that allows the CID 82 to operate smoothly can be secured, the gas generant 503 included in the battery outer case 20 should not be added more than the above. Accordingly, the gas generant 503 is included in the battery outer case 20 preferably with an amount corresponding to not more than 6.5 wt %, more preferably, not more than 6.0 wt % relative to the electrolyte solution 80.

Note that the "gas generant 503 included in the battery outer case 20" is also referred to as the gas generant 503 included in the nonaqueous electrolyte secondary battery. Accordingly, the amount of the "gas generant 503 included in the battery outer case 20" indicates a total amount of the gas generant 503 included in the nonaqueous electrolyte secondary battery, regardless of whether the gas generant 503 is added to the positive-electrode active material layer 53 or added to the electrolyte solution 80.

<<Graphite Particles 502 included in Positive-electrode Active Material Layer 53>> The graphite particles 502 included in the positive-electrode active material layer 53 are added for the following two reasons. The first reason that the graphite particles 502 are added to the positive-electrode active material layer 53 is to secure conductivity of the positive-electrode active material layer 53. That is, the graphite particles 502 are a material having a high conductivity. By adding the graphite particles 502 to the positive-electrode active material layer 53, conductive paths between the positive-electrode active material particles 501 are secured, so that a direct-current resistance of the positive-electrode active material layer 53 is decreased, thereby making it possible to restrain the battery resistance to be low. The nonaqueous electrolyte secondary battery proposed herein is configured such that the gas generant 503 is added to the positive-electrode active material layer 53. In this case, as the amount of the gas generant 503 thus added is larger, the direct-current resistance of the positive-electrode active material layer 53 tends to be higher. However, by adding the graphite particles 502 to such a positive-electrode active material layer 53, the direct-current resistance of the positive-electrode active material layer 53 can be restrained to be low.

In view of this, a mass ratio of the graphite particles 502 included in the positive-electrode active material layer 53 may be larger than that of the gas generant 503 included in the positive-electrode active material layer 53. Further, the graphite particles 502 in the positive-electrode active material layer 53 also function as a conductive material, for example. Accordingly, the mass ratio of the graphite particles 502 in the positive-electrode active material layer 53 may be 0.3 wt % or more, for example, preferably about 0.5 wt % or more, more preferably about 0.8 wt % or more. If the mass ratio of the graphite particles 502 included in the positive-electrode active material layer 53 is too large, a ratio of the positive-electrode active material particles 501 is decreased conversely, so that a battery capacity per unit mass is decreased. In view of this, the mass ratio of the graphite particles 502 in the positive-electrode active material layer 53 may be 6 wt % or less, preferably about 5.0 wt % or less, further preferably about 4.0 wt % or less.

The second reason that the graphite particles 502 are added to the positive-electrode active material layer 53 is to promote the gas generant 503 in the positive-electrode active material layer 53 to be eluted to the electrolyte solution 80 at the time of predetermined overcharge, in relation to the α solute 801 added to the electrolyte solution 80. Here, the following describes the α solute 801 and an operation of the cc solute 801.

<<α solute 801>> The α solute 801 is a material of which an amount in the electrolyte solution 80 is decreased due to the graphite particles 502 at an electric potential higher than the upper limit electric potential X of the positive electrode in the predetermined normal use area, but lower than the electric potential Z at which the gas generant 503 begins to be decomposed. In other words, the relationship between the upper limit electric potential X in the predetermined normal use area, the electric potential Y at which the amount of the α solute 801 in the electrolyte solution 80 begins to decrease due to the graphite particles 502, and the electric potential Z at which the gas generant 503 begins to generate gas may be X<Y<Z. The following description, for example, deals with a case where the upper limit electric potential X of the nonaqueous electrolyte secondary battery in the normal use area is set to 4.2 V (vs. Li/Li+), for example, and cyclohexylbenzene (a decomposition potential (the electric potential Z at which decomposition begins: 4.6 V (vs. Li/Li+)) is used as the gas generant 503. In this case, the α solute 801 may be a material of which an amount in the electrolyte solution 80 begins to decrease due to the graphite particles 502 at the electric potential Y (e.g., 4.3 V) that is higher than 4.2 V but lower than 4.6 V.

At the time of overcharge, an electric potential of the positive electrode becomes higher than that of the negative electrode. Further, in the positive-electrode active material layer 53, the graphite particles 502 added to the positive-electrode active material layer 53 has a high conductivity, so that an electric potential thereof tends to be high. The cc solute 801 added to the electrolyte solution 80 reacts due to the graphite particles 502 of which the electric potential is high in the positive-electrode active material layer 53. For example, the α solute 801 may be a material that enters between layers of the graphite particles 502 at an electric potential higher than the upper limit electric potential of the predetermined normal use area in the positive-electrode active material layer 53. Further, the α solute 801 may be a material that is decomposed due to the graphite particles 502 at an electric potential higher than the upper limit electric potential of the predetermined normal use area in the positive-electrode active material layer 53. Hereby, the amount of the α solute 801 in the electrolyte solution 80 begins to decrease at the electric potential higher than the upper limit electric potential of the normal use area. Particularly, the α solute 801 tends to react due to the graphite particles 502 in the positive-electrode active material layer 53. Hereby, the amount of the α solute 801 in the electrolyte solution 80 begins to decrease in the positive-electrode active material layer 53 and its surroundings at the electric potential higher than the upper limit electric potential of the normal use area.

When the amount of the α solute 801 in the electrolyte solution 80 begins to decrease in the positive-electrode active material layer 53 and its surroundings, the gas generant 503 included in the positive-electrode active material layer 53 is dissolved into the electrolyte solution 80. That is, the gas generant 503 is promoted to be dissolved into the positive-electrode active material layer 53 by the reaction of the α solute 801. When the overcharge advances in this state and the electric potential of the positive electrode further increases, the gas generant 503 is decomposed to generate gas. In the nonaqueous electrolyte secondary battery proposed herein, the amount of the α solute 801 in the electrolyte solution 80 is decreased in the positive-electrode active material layer 53 and its surroundings at the electric potential higher than the upper limit electric potential of the predetermined normal use area (in the overcharge state). When the amount of the α solute 801 is decreased, the gas generant 503 included in the positive-electrode active material layer 53 is dissolved. At this time, the amount of the gas generant 503 is locally high in the positive-electrode active material layer 53 and its surroundings. Because of this, in the nonaqueous electrolyte secondary battery proposed herein, in the overcharge state, the gas generant 503 is supplied from the inside of the positive-electrode active material layer 53. Then, a state where the gas generant 503 in the positive-electrode active material layer 53 is decomposed is maintained, so that a gas generation amount in the battery outer case 20 is hard to be saturated, and an appropriate amount of gas to operate the CID 82 is generated smoothly.

Further, in the nonaqueous electrolyte secondary battery proposed herein, the gas generant 503 may be included in the electrolyte solution 80, for example. In a case where the gas generant 503 is included in the electrolyte solution 80, the gas generant 503 included in the electrolyte solution 80 is polymerized at the time of overcharge and a film is formed on the surface of the positive-electrode active material layer 53. When such a film is formed, the gas generant 503 is hard to be supplied from the electrolyte solution 80 to the positive-electrode active material layer 53. However, the nonaqueous electrolyte secondary battery proposed herein is configured such that the gas generant 503 is included in the positive-electrode active material layer 53. Further, the α solute 801 is included in the electrolyte solution 80. Here, the amount of the α solute 801 begins to decrease at the electric potential Y higher than the upper limit electric potential X of the positive electrode in the predetermined normal use area. Due to the decrease in the amount of the α solute 801, the gas generant 503 included in the positive-electrode active material layer 53 begins to be dissolved into the electrolyte solution 80. Accordingly, even in a case where the gas generant 503 included in the electrolyte solution 80 is polymerized at the time of overcharge and a film is formed on the surface of the positive-electrode active material layer 53, the gas generant 503 is supplied to the electrolyte solution 80 in the positive-electrode active material layer 53 and its surroundings. Consequently, a state in which the gas generant 503 in the positive-electrode active material layer 53 is decomposed is maintained.

Further, the α solute 801 may begin to react at an electric potential slightly lower than the electric potential at which the gas generant 503 begins to be decomposed, for example, so that the amount of the α solute 801 in the electrolyte solution 80 is decreased. In view of this, the electric potential Y at which the α solute 801 begins to react may be, for example, any electric potential within a range from an electric potential lower, by about 0.05 V, than the electric potential Z at which the gas generant 503 begins to be decomposed, to an electric potential lower, by about 0.35 V, than the electric potential Z. More specifically, in a case where cyclohexylbenzene (a decomposition potential: 4.6 V (vs. Li/Li+)) is used as the gas generant 503, the electric potential at which the amount of the α solute 801 in the electrolyte solution 80 is decreased may be any electric potential within a range from an electric potential (4.55 V) lower, by 0.05 V, than the electric potential at which cyclohexylbenzene is decomposed, to an electric potential (4.25 V) lower, by 0.35 V, than the electric potential at which cyclohexylbenzene is decomposed. That is, the α solute 801 may be a material of which an amount in the electrolyte solution 80 is decreased due to the graphite particles 502 at an electric potential between 4.25 V and 4.55 V. Hereby, the α solute 801 reacts right before the gas generant 503 reacts, thereby making it possible to elute the gas generant 503 from the positive-electrode active material layer 53 to the electrolyte solution 80.

Further, the α solute 801 may be a salt, and may be ionic liquid, for example. In this case, the α solute is ionized in the electrolyte solution 80. Because of this, a capacitance component is increased in the electrolyte solution 80. This advances charging and discharging in a low temperature environment, for example. Further, the α solute 801 may be ionic liquid including a cation having a planar structure insertable between layers of the graphite particles 502. Examples of the α solute 801 include imidazolium salt, pyridinium salt, pyrrolidinium salt, and the like.

Here, the imidazolium salt includes an ionic liquid exemplified by the following chemical formula.

imidazolium

[Chemical Formula 1]

Here, the pyridinium salt includes an ionic liquid exemplified by the following chemical formula.

pyridinium

[Chemical Formula 2]

Here, the pyrrolidinium salt includes an ionic liquid exemplified by the following chemical formula.

pyrrolidinium

[Chemical Formula 3]

Here, each of R1, R2, R3, R4 may be an alkyl group, preferably an alkyl group having a carbon number of 4 or less. Preferable examples of the imidazolium salt are 1-methyl,3-ethyl imidazolium trifluoro sulfonyl imide and 1-ethyl,3-methyl imidazolium trifluoro sulfonyl imide. Further, an example of the pyridinium salt is 1-butyl,4-methyl pyridinium trifluoro sulfonyl imide. Furthermore, an example of the pyrrolidinium salt is 1-butyl,1-methyl pyrrolidinium trifluoro sulfonyl imide.

In a case where the ionic liquid including a cation having a planar structure is used as the α solute 801, the graphite particles 502 may have a structure that can absorb that cation of the α solute 801 which has a planar structure. In view of this, the graphite particles 502 may be so-called flake graphite. In this case, the flake graphite may have an interlayer distance of 340 nm or less. As the flake graphite, KS4 graphite made by TIMCAL Ltd. can be used, for example.

Figure 6:
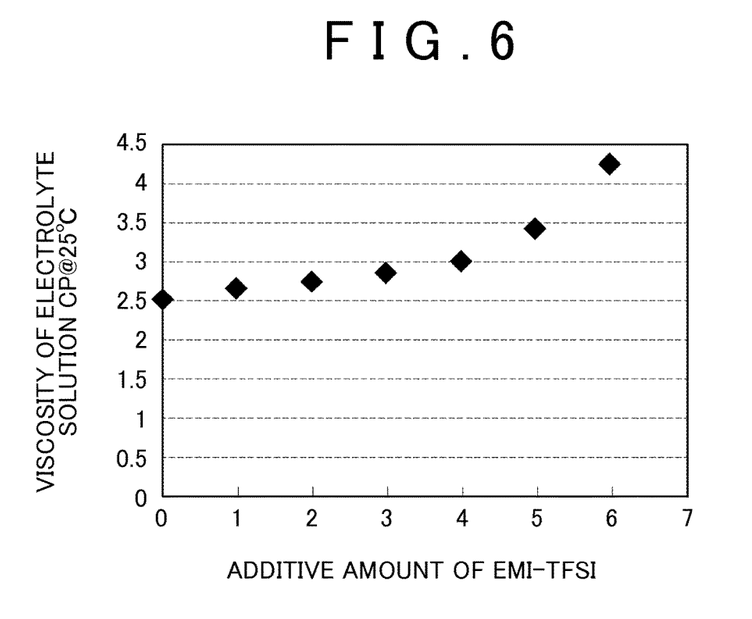
FIG. 6 is a graph showing a relationship between an additive amount of "EMI-TFSI" and a viscosity of the electrolyte solution.
Figure 7:
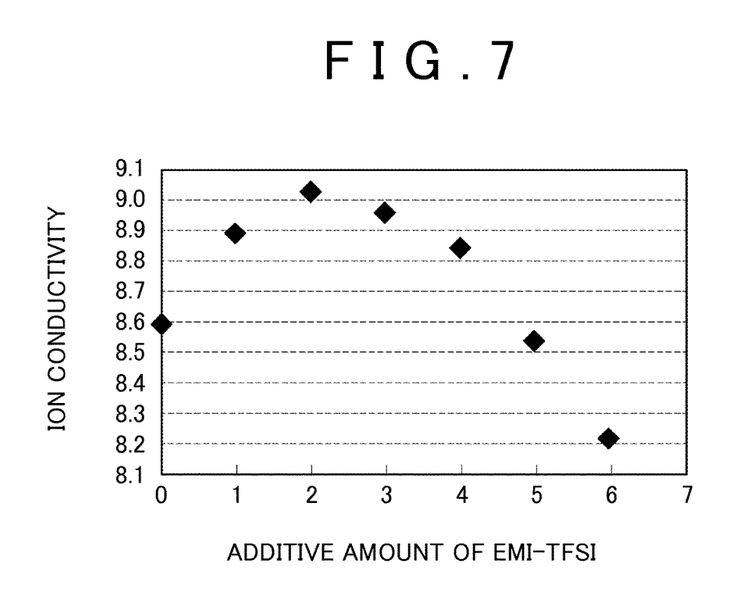
FIG. 7 is a graph showing a relationship between the additive amount of "EMI-TFSI" and an ionic conductivity.

Further, FIG. 6 shows a relationship between an additive amount of "EMI-TFSI" and a viscosity of the electrolyte solution 80. Here, "EMI-TFSI" is 1-ethyl,3-methyl imidazolium trifluoro sulfonyl imide, and is used as the α solute 801. Further, FIG. 7 shows a relationship between the additive amount of "EMI-TFSI" and an ionic conductivity. Here, the ionic conductivity can be measured by CT-57101B made by DKK-TOA CORPORATION, for example.

As illustrated in FIG. 6, as the additive amount of the α solute 801 in the electrolyte solution 80 is larger, the viscosity of the electrolyte solution 80 tends to increase. Further, as illustrated in FIG. 7, the amount of the α solute 801 to be added to the electrolyte solution 80 is increased, and after the additive amount of the α solute 801 reaches about 2 mol/L, the ionic conductivity of the electrolyte solution 80 is gradually decreased. When the viscosity of the electrolyte solution 80 is increased or the ionic conductivity is decreased, a diffusive resistance of an electrolyte in the electrolyte solution 80 is increased. For example, in the lithium-ion secondary battery, a diffusive resistance of lithium ions in the electrolyte solution 80 is increased, which causes a high battery resistance. In view of this, based on the finding of the inventor(s), the additive amount of the α solute 801 in the electrolyte solution 80 may be less than about 5 mol/L (e.g., not less than 1.0 mol/L but not more than 4.0 mol/L).

The following describes a specific example of the nonaqueous electrolyte secondary battery proposed herein.

In the nonaqueous electrolyte secondary battery proposed herein, a positive electrode sheet having a positive-electrode active material layer on either side of a positive current collector, and a negative electrode sheet having a negative-electrode active material layer on either side of a negative current collector were manufactured.

The positive electrode sheet is obtained in the following procedure. First, $LiNi_{1/3}Co_{1/3}Mn_{1/3}O_2$ powder as positive-electrode active material particles, acetylene black (AB) as a conductive material, and polyvinylidene fluoride (PVdF) as a binder are prepared. These materials are mixed with N-methylpyrrolidone (NMP) so that a mass ratio (wt %) of the positive-electrode active material particles:the conductive material:the binder is 93:4:3 and a solid content concentration is about 70 mass %. Hereby, a slurry composition (a positive electrode paste) for forming a positive-electrode active material layer is prepared. Then, the positive electrode paste is applied, in a belt shape, to both sides of a belt-shaped aluminum foil (a positive current collector) having a thickness of about 15 μm so that its coating amount (of both sides) is 29 mg/cm² (on a solid content basis). The positive electrode paste is then dried in a dry atmosphere of 120° C. A resultant object is subjected to roll press, so that a density of the positive-electrode active material layer is adjusted to 2.8 g/cm³.

In the meantime, the negative electrode sheet is obtained in the following procedure. First, natural graphite powder (an average particle diameter: 5 μm, a specific surface area: 3 m²/g) as a negative-electrode active material, styrene butadiene rubber (SBR) as a binder, and carboxymethyl cellulose (CMC) as a thickener are prepared. These materials are mixed with ion-exchanged water so that a mass ratio (wt %) between these materials is 98:1:1 and a solid content concentration is about 45 mass %. Hereby, a slurry composition (a negative electrode paste) for forming a negative-electrode active material layer is prepared. The negative-electrode active material slurry is applied to either side of a belt-shaped copper foil (a negative current collector) having a thickness of about 10 μm, and then dried. Thus, a negative electrode sheet having a negative-electrode active material layer on either side of the negative current collector is manufactured. The negative electrode sheet is subjected to roll press, so that a density of the negative-electrode active material layer is adjusted to 1.3 g/cm$^3$. Here, a coating weight of the negative-electrode active material layer is adjusted to have a capacity that is 1.4 times a capacity of its opposed positive-electrode active material layer.

Here, the positive electrode sheet and the negative electrode sheet thus obtained were wound via belt-shaped separators so as to have a predetermined length. Hereby, a wound electrode body was obtained, and a battery (rated capacity: about 1 Ah) having a standard size of 18650 was manufactured. A nonaqueous electrolyte solution used herein was obtained as follows: a mixed solvent containing ethylene carbonate (EC) and diethyl carbonate (DEC) such that a volume ratio thereof satisfies EC:DEC=3:7 was prepared; LiPF$_6$ as a supporting electrolyte was dissolved in the mixed solvent so that a concentration thereof was 1.0 mol/L; and 1.0 wt % vinylene carbonate (VC) and a given amount of cyclohexylbenzene (CHB) were added thereto appropriately. With such a configuration being taken as a basic configuration, various batteries (e.g., Sample 1 to Sample 4) were obtained.

<Sample 1> Here, Sample 1 is a nonaqueous electrolyte secondary battery using an electrolyte solution adjusted so that an additive amount of cyclohexylbenzene (CHB) was 4.0 wt % in the above basic configuration.

<Sample 2> Further, in Sample 2, cyclohexylbenzene (CHB) was added when the positive electrode paste was obtained, in the basic configuration. Further, the positive electrode paste was adjusted so that the positive-electrode active material layer had such a composition that a mass ratio (wt %) of the positive-electrode active material particles:the conductive material:the binder:cyclohexylbenzene (CHB) was 89.3:6:3:1.7. Further, Sample 2 used an electrolyte solution to which no cyclohexylbenzene (CHB) was added. Here, an amount of cyclohexylbenzene (CHB) included in the positive-electrode active material layer is about the same as (equivalent to) an additive amount thereof to the electrolyte solution, which is 4.0 wt %. Sample 1 and Sample 2 were adjusted so that the same amount of cyclohexylbenzene (CHB) was included in respective battery outer cases. In Sample 1, an entire amount of cyclohexylbenzene (CHB) was added to the electrolyte solution. On the other hand, in Sample 2, an entire amount of cyclohexylbenzene (CHB) was added to the positive-electrode active material layer.

<Sample 3> In Sample 3, graphite particles and cyclohexylbenzene (CHB) were added when the positive electrode paste was obtained, in the basic configuration. Further, the positive electrode paste was adjusted so that the positive-electrode active material layer had such a composition that a mass ratio (wt %) of the positive-electrode active material particles:the conductive material (AB):the graphite particles:the binder:cyclohexylbenzene (CHB) was 90.15:3:3:3:0.85. Hereby, the positive electrode sheet was obtained. Further, Sample 3 used an electrolyte solution adjusted such that the additive amount of cyclohexylbenzene (CHB) was 2.0 wt % and 1-ethyl,3-methyl imidazolium trifluoro sulfonyl imide (EMI-TFSI) was 2 mol/L. Here, Sample 3 was adjusted so that the amount of cyclohexylbenzene (CHB) included in the battery outer case was the same as Sample 1 and Sample 2. In Sample 3, half of cyclohexylbenzene (CHB) was added to the electrolyte solution, and remaining half thereof was added to the positive-electrode active material layer. Further, Sample 3 is different from Sample 1 and Sample 2 in that EMI-TFSI was added, as the α solute, to the electrolyte solution.

<Sample 4> In Sample 4, graphite particles and cyclohexylbenzene (CHB) were added when the positive electrode paste was obtained, in the basic configuration. Further, the positive electrode paste was adjusted so that the positive-electrode active material layer had such a composition that a mass ratio (wt %) of the positive-electrode active material particles:the conductive material (AB):the graphite particles:the binder:cyclohexylbenzene (CHB) was 89.3:3:3:3:1.7. Hereby, the positive electrode sheet was obtained. Further, Sample 4 used an electrolyte solution to which no cyclohexylbenzene (CHB) was added and which was adjusted so that 1-ethyl,3-methyl imidazolium trifluoro sulfonyl imide (EMI-TFSI) was 2 mol/L. Here, Sample 4 was adjusted so that the amount of cyclohexylbenzene (CHB) included in the battery outer case was the same as Samples 1 to 3. In Sample 4, an entire amount of cyclohexylbenzene (CHB) was added to the positive-electrode active material layer. Further, Sample 4 is different from Sample 1 and Sample 2 in that EMI-TFSI was added, as the α solute, to the electrolyte solution.

In terms of each of the samples, after a predetermined conditioning step was performed, a battery resistance was measured, and further, an overcharge gas generation amount was measured.

<Conditioning Step> In the conditioning step, a charging process is performed on the electrode body to a predetermined charging voltage. By performing the charging process, the nonaqueous electrolyte solution (typically, a nonaqueous solvent in the nonaqueous electrolyte solution) is decomposed, so that a film derived from the nonaqueous solvent can be formed on the surface of the active material. Hereby, an interface between the active material and the nonaqueous electrolyte solution is stabilized, so that decomposition of the nonaqueous electrolyte solution (typically, the nonaqueous solvent) can be restrained appropriately in the charging and discharging performed after that.

Here, in the charging process in the conditioning step, three cycles of Procedures 1 and 2 described below were performed in a temperature environment of about 25° C. Procedure 1: Charging is performed at a constant current of ⅓ C, and after a voltage reaches 4.1 V, the charging is stopped for ten minutes. Procedure 2: After Procedure 1, discharging is performed at a constant current of ⅓ C, and after the voltage reaches 3.0 V, the discharging is stopped for ten minutes.

<Measurement of Battery Resistance (SOC of 20%)> The battery resistance is measured as follows: after the conditioning step, discharging is performed at a constant current of 1 C in a temperature environment of 25° C., so that an open circuit voltage reaches 3.0 V (cc discharge). After that, by performing constant voltage and constant current charge (cccv charge) at 1 C, the voltage is adjusted so that an SOC reaches 20%. Thereafter, in a temperature environment of 25° C., discharging is performed at a constant current of 10 C (constant-current discharge) for ten seconds, and then, a voltage drop amount ΔV is measured. The voltage drop amount ΔV is divided by a total amount of current (ΔAs) that has flowed during the 10-second discharging, and a value obtained hereby is assumed a battery resistance (ΔV/ΔAs).

<Gas Generation Amount (Overcharge Gas Generation Amount)> A gas generation amount measured herein is a gas amount generated in the overcharge state. Herein, a battery of which the battery resistance has been measured is adjusted to an SOC of 100%. Then, in a temperature environment of 25° C., overcharging is performed at a constant current of 1 C. Then, a gas generation amount (an actual gas generation amount) in an SOC of 130% is divided by a 1-C capacity, and a value obtained hereby is assumed a gas generation amount (overcharge gas generation amount). Here, the gas generation amount (a gas amount actually generated) in the SOC of 130% is measured by attaching an internal pressure sensor to the battery outer case 20. That is, a generation amount (mL) of gas generated in the battery outer case 20 until the SOC reaches 130% is measured from a difference (an increased amount of the internal pressure) between that internal pressure of the battery outer case 20 which is measured in the SOC of 100% and that internal pressure of the battery outer case 20 which is measured in the SOC of 130%. Further, in this test, a battery designed so that the 1-C capacity is 5 Ah is used. The generation amount (mL) of gas generated in the battery outer case 20 until the SOC reaches 130% is divided by the 1-C capacity (here 5 Ah) of the battery, so that an overcharge gas generation amount (mL/Ah) in the SOC of 130% is found. Since the generation amount (mL) of gas generated in the battery outer case 20 is divided by the 1-C capacity of the battery, the gas generation amount can be relatively evaluated in consideration of a difference in size of the battery outer case 20 and a battery capacity (rated capacity).

As described above, the amount of CHB included in the battery outer case of each of Samples 1 to 4 is 4 wt % in terms of an amount corresponding to a case where an entire amount of CHB is added to the electrolyte solution. FIG. 3 shows a relationship between the amount of CHB and the battery resistance (the SOC of 20%), more specifically, in regard to Samples 1 to 4. FIG. 4 shows a relationship between the amount of CHB and the overcharge gas generation amount (mL/Ah), more specifically, in regard to Samples 1 to 4. Note that the amount of CHB here indicates an amount of CHB included in the battery outer case. Further, the amount of CHB is evaluated based on an additive amount (a mass ratio) thereof in the electrolyte solution, assuming that CHB is added to the electrolyte solution.

As such, in Sample 1, an entire amount of cyclohexylbenzene as the gas generant is added to the electrolyte solution. Although acetylene black as the conductive material is included in the positive-electrode active material layer, no graphite particles are included therein. Further, the α solute is not included in the electrolyte solution. Sample 1 is indicated by a black circular plot at a position where the amount of CHB is 4 wt % in FIGS. 3 and 4. In this case, the battery resistance (the SOC of 20%) is high, and the gas amount generated in the overcharge state is not so high. The other black circular plots at the other positions in FIGS. 3 and 4 have the same configuration as Sample 1, but are changed in the additive amount of cyclohexylbenzene to the electrolyte solution. In the configuration of Sample 1, the gas generation amount is increased until the additive amount of cyclohexylbenzene to the electrolyte solution reaches about 4 wt %. However, even if the additive amount of cyclohexylbenzene to the electrolyte solution is increased to 4 wt % or more, the gas amount to be generated in the overcharge state is not increased.

Further, in Sample 2, an entire amount of cyclohexylbenzene as the gas generant is added to the positive-electrode active material layer. Although acetylene black as the conductive material is included in the positive-electrode active material layer, no graphite particles are included therein. Further, the α solute is not included in the electrolyte solution. Sample 2 is indicated by a black triangular plot at a position where the amount of CHB is 4 wt % in FIGS. 3 and 4. In this case, the battery resistance (the SOC of 20%) is further higher than Sample 1, and the gas amount generated in the overcharge state is about the same as. Sample 1. Further, the other black triangular plots at the other positions in FIGS. 3 and 4 have the same configuration as Sample 2, but are changed in the additive amount of cyclohexylbenzene to the electrolyte solution. In the configuration of Sample 2, as the additive amount of cyclohexylbenzene to the positive-electrode active material layer is increased, the battery resistance is increased.

Further, in Sample 3, an entire amount of cyclohexylbenzene as the gas generant is added to the positive-electrode active material layer. Acetylene black and graphite particles are included, as the conductive material, in the positive-electrode active material layer. Further, the α solute is included in the electrolyte solution. Sample 3 is indicated by a black rhombus-shaped plot at a position where the amount of CHB is 4 wt % in FIGS. 3 and 4. In this case, the battery resistance (the SOC of 20%) is lower than Sample 1 and Sample 2, and the gas amount generated in the overcharge state is markedly larger than Sample 1 and Sample 2. As such, in the configuration of Sample 3, it is possible to restrain the battery resistance to be low, and to markedly increase the das amount generated in the overcharge state. Accordingly, in the configuration of Sample 3, it is possible to restrain the battery resistance in a normal state to be low and to operate the CID 82 smoothly in the overcharge state.

Further, in Sample 4, half of cyclohexylbenzene as the gas generant is added to the positive-electrode active material layer, and remaining half of cyclohexylbenzene is added to the electrolyte solution. Acetylene black and graphite particles are included, as the conductive material, in the positive-electrode active material layer. Further, the α solute is included in the electrolyte solution. Sample 4 is indicated by a blank circular plot at a position where the amount of CHB is 4 wt % in FIGS. 3 and 4. In this case, the battery resistance (the SOC of 20%) is further lower than Sample 3, which is lower than Sample 1 and Sample 2. Further, the gas amount generated in the overcharge state is slightly smaller than Sample 3, but still markedly larger than Sample 1 and Sample 2. As such, in the configuration of Sample 4, it is possible to restrain the battery resistance to be low, and to markedly increase the gas amount generated in the overcharge state. Accordingly, in the configuration of Sample 4, it is possible to restrain the battery resistance in a normal state to be low and to operate the CID 82 (see FIG. 1) smoothly in the overcharge state.

Like Sample 3 and Sample 4, the nonaqueous electrolyte secondary battery 10 (see FIG. 1) proposed herein is configured such that the positive-electrode active material layer 53 includes the graphite particles 502 and the gas generant 503, as illustrated in FIG. 5. Further, the electrolyte solution 80 includes the α solute 801. Here, the gas generant 503 is a material that is decomposed to generate gas in a predetermined overcharge state. The α solute 801 is a material of which an amount in the electrolyte solution 80 is decreased due to the graphite particles 502 in the predetermined overcharge state and at an electric potential lower than the electric potential Z at which the gas generant 503 begins to be decomposed (see FIG. 5). In other words, a relationship between the upper limit electric potential X of the positive electrode, in the predetermined normal use area in the nonaqueous electrolyte secondary battery 10, the electric potential Y at which the amount of the α solute 801 in the electrolyte solution 80 begins to decrease due to the graphite particles 502, and the electric potential Z at which the gas generant 503 begins to generate gas is X<Y<Z.

In such a configuration, the gas generant 503 included in the positive-electrode active material layer 53 is eluted at the time of overcharge, and an elution amount of the gas generant 503 is increased in the positive-electrode active material layer 53 and its surroundings. This makes it possible to smoothly generate much gas due to the gas generant 503. Further, the gas generant 503 is added to the positive-electrode active material layer 53. However, since the graphite particles 502 are included in the positive-electrode active material layer 53, it is possible to restrain the battery resistance to be low. Accordingly, it is possible to restrain the battery resistance in a normal state to be low and to operate the CID 82 smoothly by generating much gas in the overcharge state.

Here, the α solute 801 may be a material of which an amount begins to decrease at an electric potential slightly lower than an electric potential at which the gas generant 503 reacts. Further, the electric potential at which the gas generant 503 reacts varies depending on the type of the gas generant 503.

As a preferable combination of the gas generant 503 and the α solute 801, a combination of cyclohexylbenzene (CHB) and 1-ethyl,3-methyl imidazolium trifluoro sulfonyl imide (EMI-TFSI) is exemplified. In a case where the upper limit electric potential of the positive electrode in the normal use area set in the lithium-ion secondary battery is 4.2 V (vs. Li/Li+), the gas generant 503 (CHB) and the α solute 801 (EMI-TFSI) both do not react at an electric potential lower than the upper limit electric potential. In the overcharge state in which charging is performed with the upper limit electric potential of the positive electrode exceeding 4.2 V (vs. Li/Li+), when the electric potential of the positive electrode reaches about 4.3 V (vs. Li/Li+), EMI-TFSI as the α solute 801 reacts, so that the amount thereof in the electrolyte solution 80 begins to decrease. When the amount of EMI-TFSI begins to decrease, elution of cyclohexylbenzene (CHB) in the positive-electrode active material layer 53 is promoted, so that an amount of cyclohexylbenzene (CHB) in the electrolyte solution is increased in the positive-electrode active material layer 53 and its surroundings. When the electric potential of the positive electrode reaches about 4.6 V (vs. Li/Li+), cyclohexylbenzene (CHB) reacts and begins to generate gas ($H_2$).

The combination of the gas generant 503 and the α solute 801 is not limited to the combination of CHB and EMI-TFSI. In consideration of a charging potential in the normal use of the nonaqueous electrolyte secondary battery, appropriate materials may be selected for the gas generant 503 and the α solute 801, and used with appropriate amounts in combination. Further, like Sample 3, an entire amount of the gas generant 503 may be added to the positive-electrode active material layer 53. Further, like Sample 4, part of the gas generant 503 may be added to the positive-electrode active material layer 53, and remaining part thereof may be added to the electrolyte solution 80. A ratio of the gas generant 503 to be added to the positive-electrode active material layer 53, and a ratio of the gas generant 503 to be added to the electrolyte solution 80 can be adjusted appropriately.

The nonaqueous electrolyte secondary battery according to one embodiment of the present invention has been described above, but the nonaqueous electrolyte secondary battery proposed herein is not limited to the above embodiment.

For example, as the shape of the battery, various shapes including a rectangular battery, a cylindrical battery, a laminated type in which an outer packaging is covered with a film laminate, and the like can be employed. Accordingly, the battery outer case is not limited to a metal hard case. Further, the above configuration exemplifies a case where the positive-electrode active material layer is manufactured such that a mixture paste (a positive electrode paste) is formed, and the mixture paste is applied to a current collector foil and then dried. The positive-electrode active material layer is not limited to such a configuration, and may be formed, for example, such that powder of the positive-electrode active material is mixed with a binder and then granulated to form granulated particles, and the granulated particles are molded on a current collector foil. Even in this case, the graphite particles and the gas generant may be added at a stage of forming the granulated particles, so that the positive-electrode active material layer includes the graphite particles and the gas generant.

Further, the nonaqueous electrolyte secondary battery (typically, the lithium-ion secondary battery) proposed herein is usable for various purposes. The nonaqueous electrolyte secondary battery includes an active material layer having a low resistance, and has high battery performance. Accordingly, the nonaqueous electrolyte secondary battery can be preferably used for a purpose that requires high energy density and high power density. Such a purpose includes a power source (driving power supply) for a motor to be provided in a vehicle, for example. The type of the vehicle is not limited in particular, but may be, for example, a plug-in hybrid vehicle (PHV), a hybrid vehicle (HV), an electric vehicle (EV), an electric truck, a motorized bicycle, an electric assist bicycle, a powered wheelchair, an electric railway, and the like. Note that the nonaqueous electrolyte secondary battery may be used in a form of a battery pack configured such that a plurality of nonaqueous electrolyte secondary batteries is connected in series and/or in parallel to each other.

For example, the nonaqueous electrolyte secondary battery proposed herein is particularly preferably used as a vehicle driving battery to be provided in a vehicle. Here, the vehicle driving battery can be in the form of the battery pack formed such that a plurality of nonaqueous electrolyte secondary batteries (typically, lithium-ion secondary batteries) is connected in series. Typical examples of the vehicle provided with such a vehicle driving battery as a power supply include an automobile, particularly an automobile provided with a motor, such as a hybrid vehicle (including a plug-in hybrid vehicle) and an electric vehicle. Further, another example of the nonaqueous electrolyte secondary battery is a sodium ion secondary battery.

What is claimed is:

1. A nonaqueous electrolyte secondary battery comprising:
    a battery outer case;
    an electrode body accommodated in the battery outer case, where the electrode body includes a positive current collector and a positive-electrode active material layer held by the positive current collector, the positive-electrode active material layer includes graphite particles and a gas generant in a solid content, and the gas generant is cyclohexylbenzene; and
    an electrolyte solution accommodated in the battery outer case, where the electrolyte solution includes an α solute, and the α solute is selected from the group consisting of imidazolium salt, pyridinium salt, and pyrrolidinium salt, wherein the nonaqueous electrolyte secondary is configured such that an electrical potentials relationship of X<Y<Z is satisfied when the nonaqueous electrolyte secondary is in use, where X is an upper limit electric potential of a positive electrode in a predetermined normal use area, Y is an electric potential at which an amount of the α solute in the electrolyte solution begins to decrease due to the graphite particles, Z is an electric potential at which the gas generant begins to generate gas, the electric potentials are based on an equilibrium potential (vs. Li/Li+) of metallic lithium, and X is from 3.9 to 4.3 V;

an amount of the gas generant in the nonaqueous electrolyte secondary battery is equal to or larger than 3.0 wt % and less than 7.0 wt % relative to the electrolyte solution; and the positive-electrode active material layer includes at least one third of the gas generant included in the nonaqueous electrolyte secondary battery.

2. The nonaqueous electrolyte secondary battery according to claim 1, wherein the electric potential Y is an electric potential within a range from an electric potential lower than the electric potential Z by 0.05 V to an electric potential lower than the electric potential Z by 0.35 V.

3. The nonaqueous electrolyte secondary battery according to claim 1, wherein a mass ratio of the graphite particles included in the positive-electrode active material layer is larger than a mass ratio of the gas generant included in the positive-electrode active material layer.

4. The nonaqueous electrolyte secondary battery according to claim 1, wherein the graphite particles are flake graphite.

5. The nonaqueous electrolyte secondary battery according to claim 1, wherein the α solute is an ionic liquid including a cation having a planar structure insertable between layers of the graphite particles.

6. The nonaqueous electrolyte secondary battery according to claim 1, wherein an additive amount of the α solute in the electrolyte solution is less than 5 mol/L.

7. A nonaqueous electrolyte secondary battery comprising:

a battery outer case;

an electrode body accommodated in the battery outer case, where the electrode body includes a positive current collector and a positive-electrode active material layer held by the positive current collector, the positive-electrode active material layer includes graphite particles and a gas generant in a solid content, and the gas generant is cyclohexylbenzene; and an electrolyte solution accommodated in the battery outer case, where the electrolyte solution includes an α solute, and the α solute is selected from the group consisting of imidazolium salt, pyridinium salt, and pyrrolidinium salt, wherein the nonaqueous electrolyte secondary is configured such that an electrical potentials relationship of X<Y<Z is satisfied when the nonaqueous electrolyte secondary is in use, where X is an upper limit electric potential of a positive electrode in a predetermined normal use area, Y is an electric potential at which an amount of the α solute in the electrolyte solution begins to decrease due to the graphite particles, Z is an electric potential at which the gas generant begins to generate gas, the electric potentials are based on an equilibrium potential (vs. Li/Li+) of metallic lithium, and X is 3.9 to 4.3 V; and an additive amount of the α solute in the electrolyte solution is less than 5 mol/L.

8. The nonaqueous electrolyte secondary battery according to claim 7, wherein the electric potential Y is an electric potential within a range from an electric potential lower than the electric potential Z by 0.05 V to an electric potential lower than the electric potential Z by 0.35 V.

9. The nonaqueous electrolyte secondary battery according to claim 7, wherein a mass ratio of the graphite particles included in the positive-electrode active material layer is larger than a mass ratio of the gas generant included in the positive-electrode active material layer.

10. The nonaqueous electrolyte secondary battery according to claim 7, wherein the graphite particles are flake graphite.

11. The nonaqueous electrolyte secondary battery according to claim 7, wherein the α solute is an ionic liquid including a cation having a planar structure insertable between layers of the graphite particles.

12. The nonaqueous electrolyte secondary battery according to claim 7, wherein an amount of the gas generant in the nonaqueous electrolyte secondary battery is equal to or larger than 3.0 wt % and less than 7.0 wt % relative to the electrolyte solution.

13. The nonaqueous electrolyte secondary battery according to claim 7, wherein the positive-electrode active material layer includes at least one third of the gas generant included in the nonaqueous electrolyte secondary battery.

* * * * *